United States Patent Office 2,801,380
Patented July 30, 1957

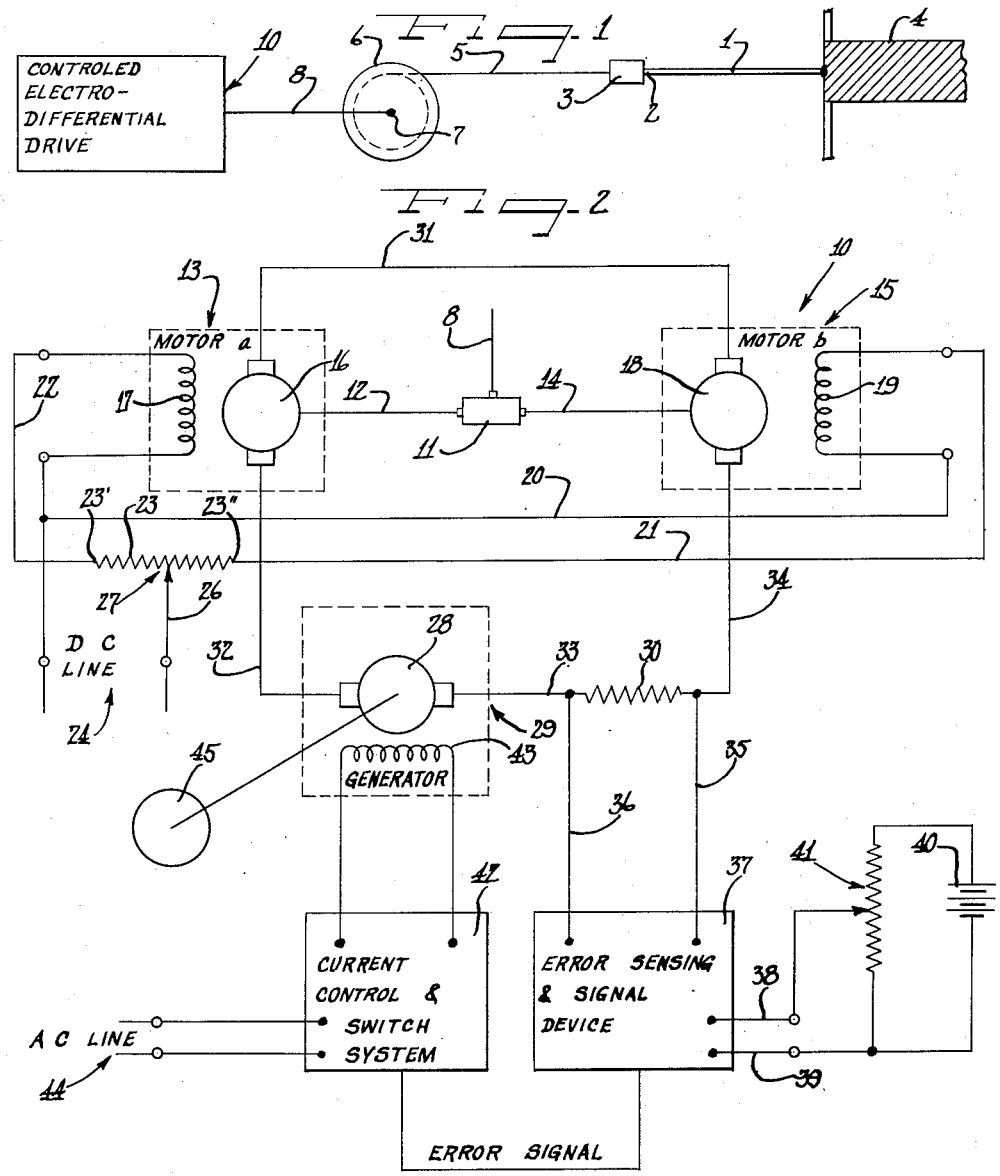

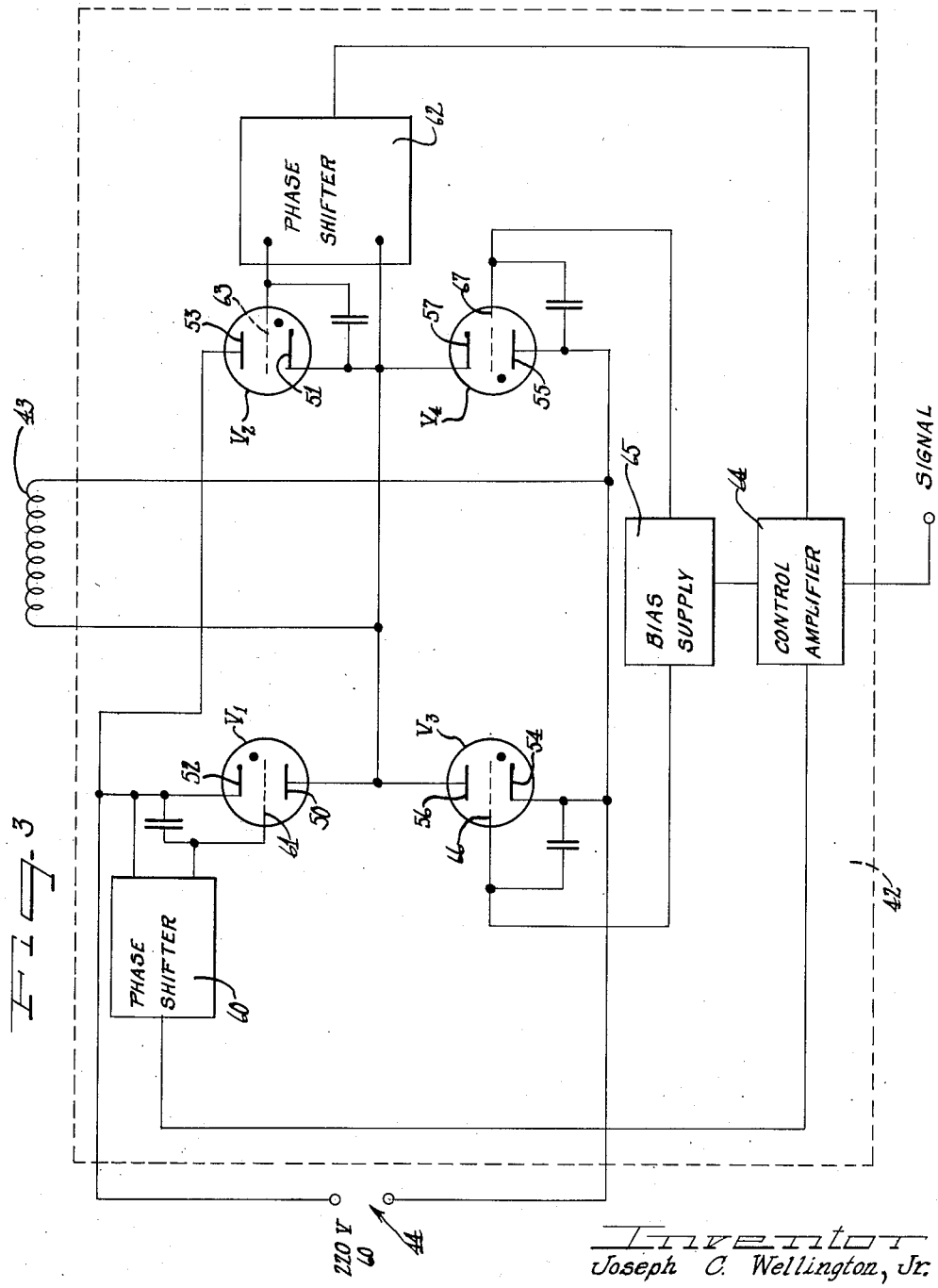

2,801,380

GENERATOR CONTROL SYSTEM

Joseph C. Wellington, Jr., Euclid, Ohio, assignor to Thompson Products, Inc., Cleveland, Ohio, a corporation of Ohio Application July 14, 1953, Serial No. 367,929

3 Claims. (Cl. 322—27)

This invention relates to bi-directional control systems and more particularly to systems for bi-directionally controlling current flow in one portion of a controlled system to maintain current in another portion of the controlled system substantially constant.

The present invention by providing a new and improved bi-directional current or energization control system has many distinct advantages over former systems and has highly versatile utility in its ability to continuously control current from a maximum in one direction through zero to a maximum in the opposite direction.

One of the distinct advantages of the system of the present invention is in combination with an electro-differential drive system in an environment such as wire drawing or extrusion of various forms of work where a constant torque is highly desirable, if not essential.

Electro-differential drive systems are known in the are in various forms, some of which are heavy, bulky, clumsy and expensive units employing differential gear systems or the like while others are more advantageous in all respects. A preferred form of electro-differential drive systems is described and claimed in the copending application of Walter R. Chapman, entitled "Electric Differential Drive," Serial No. 360,480, filed June 9, 1953, now Patent No. 2,740,909.

Electro or electric differential systems are particularly advantageous and useful systems providing a highly controllable output frequently extremely desirable. In preferred forms of electro-differential drive systems, the armatures of a pair of direct current electic motors are connected together in series electrically and connected together either with reversing gears or with differential gearing arrangements for a single mechanical output. The field windings of the two motors are usually connected together through a special energizing circuit so that by selective control of the field windings a highly controllable output of smooth speed variations from maximum in one direction through zero to a maximum in the opposite direction may be obtained. In the most preferred system of an electro-differential drive, the fields, the armatures and the gear coupling arrangements are contained within a common housing with the fields of the two direct current motors rotated in one direction and with the armatures of the two motors rotated in opposite directions.

In these systems, one of the motors operates as a generator and the other as a motor for controlled rotation of the output shaft in one direction, while for controlled rotation of the output shaft in the other direction the first motor is operated as a motor and the second motor is operated as a generator. As stated, this is accomplished through control of the field windings current. It should be understood, of course, that numerous other variations in electro-differential drive systems are available and that while the above described system is preferred, the control system of the present invention is operable with all such systems as well as many other types and characters of systems. An important use of electro-differential drive systems, as stated, is in conjunction with wire drawing or extrusion work drawing. Several of the advantages of these systems in that employment lies in their extremely smooth speed control and highly variable speed control with small loss of power. In such an environment, however, it is extremely desirable to provide the system with a constant torque output, so that the work such as the drawn wire or extruded work will be drawn or extruded under a substantially constant force, thereby reducing or substantially eliminating any tendency for the work piece to have irregularities or possible breaks or cracks therein.

By the system of the present invention, electro-differential drives may be readily provided with a constant torque output. The system of the present invention is most succinctly described as a highly versatile current control system operable to control current smoothly from a maximum in one direction through zero to a maximum in the opposite direction. Since, with other factors remaining controlled or constant, torque is a direct function of armature current in an electric motor system, highly stable control of the armature current will provide such motor systems as electro-differential drive systems with a constant torque output. The system of the present invention is so operable.

It is therefore an important object of the present invention to provide a work drawing system with an electro-differential drive substantially constant torque output.

Another important object of the present invention is to provide an electro-differential drive system with a substantially constant armature current and thereby with a substantially constant torque output.

Another important object of the present invention is to provide an electro-differential drive system with armature current control means operable to control the armature current and to maintain the same substantially constant at a preselected value.

Still another object of the present invention is to provide an electro-differential drive system with an additional generator unit in the armature circuit and means to control the output of that generator unit to maintain the armature current substantially constant at any controlled preselected value thereof.

Still another object of the present invention is to provide a bi-directional field control system to maintain the current in the armature circuit substantially constant.

It is still another important object of the present invention to provide a bi-directional current control system operable to pass current at a direction and amplitude in accordance error signals such that the amplitude of the current passed is proportional to the amplitude of the error signal and the direction of the current passed is functionally opposite to the direction of the error signal.

Yet another object of the present invention is to provide a bi-directional current control system wherein error signal means controls switch means to control current flow smoothly and stably from a maximum in one direction through zero to a maximum in the opposite direction.

Still other and further objects, features and advantages of the present invention will readily present themselves from the foregoing and from the following detailed description and appended claims and from the accompanying drawings which form an integral part of this description, in which like reference numerals refer to like parts, and in which:

Figure 1 is a diagrammatic illustration of a work extrusion or wire drawing system operated by a controlled electro-differential drive system in accordance with the principles of the present invention;

Figure 2 is a schematic illustration of an electro-differential drive system and control system forming a preferred embodiment of the present invention; and Figure 3 is a schematic diagram of the current control switch system forming a preferred embodiment of the present invention.

As it was pointed out hereinabove, a preferred and particularly advantageous use of an electro-differential drive system is in conjunction with work extrusion or drawing. It was also stated that for most efficient work extrusion or drawing, the operation should be conducted at substantially constant torque output at the drive system. It was further stated that constant torque output may be provided from a system of this character by controlling the current in the series connected armature circuit. By the system of the present invention such armature circuit current control is readily available.

In Figure 1, there is schematically illustrated one form of drawing or extending apparatus wherein a work piece 1 having its leading end 2 secured in a clamp or the like 3 is drawn through a die 4 with an aperture of preselected cross-sectional configuration therein through which the work is drawn. The drawing forces are applied to the clamp 3 firmly gripping the leading ends 2 of the work piece 1 through a cable or the like 5 wound on a drum or winch reel or the like 6 preferably having a substantially constant barrel diameter and rotated under a constant torque to provide a constant tensioned drawing force to the work piece 1. The drum or spool or reel or the like 6, is connected at its hub 7 to a driving shaft 8 which is also in this preferred embodiment of the present invention, the output shaft from a controlled electro-differential drive system indicated generally at 10.

It will be understood, of course, that numerous coupling systems such as clutch systems and gear reducing systems and the like are available for coupling the output shaft 8 of the controlled electro-differential drive system 10 to the drum 6 at its hub 7.

The electro-differential drive system 10 of Figure 1 is schematically illustrated more completely in Figure 2. Herein, it is illustrated as a preferred embodiment of the present invention with the output drive shaft 8 coupled through a suitable mechanical coupling arrangement 11, depending upon the specific electro-differential drive system employed, to armature shaft 12 of motor a, indicated generally at 13, and armature shaft 14 of motor b, indicated generally at 15. The motor a, 13 of the electro-differential drive system 10 has an armature 16 and a field winding of coil or coils 17 and the motor b, 15 of the same system has an armature 18 and a field of winding or windings 19. Illustrative of a control and energizing system for the fields 17 and 19 of the motors 13 and 15, respectively, which in preferred electro-differential drive systems are direct current motors, without any intention to be restrictive of the present invention, is the field energizing and control circuit shown in Figure 2, wherein the fields 17 and 19 are connected in series through conductors 20, 21 and 22 and in series with the resistance element 23 of a potentiometer rheostat or the like between the conductors 21 and 22. A direct current line or power source 24 is connected at one side to the line 20 interconnecting the field winding 17 and the field winding 19, and at the other side to the arm 25 of the potentiometer or rheostat element 27, thereby connecting the same variably through the resistance element 23 and the conductors 21 and 22 to the opposite sides of the field coils 17 and 19 of motors 13 and 15, respectively.

From this energization system it should be clear that movement of the arm 26 of the rheostat or potentiometer 27 to the end 23′ nearest the winding 17 will place full line potential across the field 17 but will provide the field 19 with a potential reduced by the voltage drop in the resistance element 23. Movement of the arm 26 to the opposite end 23″ of the resistance element 23 will obviously place a greater potential on the field winding 19 than the potential on the field winding 17. This control in an electro-differential drive system provides a very smooth speed control for the output shaft 8 but is shown schematically here as only a preferred system.

The armatures 16 and 18 of the motors a and b, 13 and 15, respectively, of the electro-differential drive system 10, in accordance with the principles of the present invention are connected in series with each other and with the armature 28 of a direct current control generator, indicated generally at 29, and a small resistance element 30 described more fully hereinbelow in conjunction with the operating principles of this system of the present invention. More particularly, the several elements immediately hereinabove identified as series connected, are so electrically connected in series that the armature 16 of motor a, 13 is directly connected, electrically, to the armature 18 of motor b, 15 through a connector 31 on one side of each thereof and to the armature 28 of generator 29 and resistor 30 electrically in series through conductors 32, 33 and 34 on the other side of each of the motor armatures 16 and 18.

The resistor 30 operates as a current sensing device and although it may take the form of numerous other types of current sensing devices, it has been illustrated here and described as a resistor, for simplicity. Current flowing in the series armature circuit causes a voltage or potential to appear across the current sensing device, resistor 30, and leads 35 and 36 transmit that potential current signal to an error sensing and signal device 37. This error sensing and signal system, which in one form thereof may be a null-adjusted bridge circuit of, for example, resistance elements, has an additional input of a reference voltage affording a comparison with the potential across the current sensing element 30. This additional reference voltage is brought into the error sensing and error signal generating device 37 through a pair of leads 38 and 39 which are connected to a source of constant potential 40 such as batteries or the like through a variable controllable potentiometer or the like 41 to control the value of the reference potential. The output of the error sensing and error signal generating device 37 is fed to a current control and switch system 42 embodying the principles of the present invention. The current control and switch system 42 controls the current flow through a field coil 43 of the generator 29 by controlling the current flow thereto from an alternating current line or power source 44 in accordance with the amplitude and direction polarity of the error signal from the error sensing and error signal generating system 37.

The manner of control of the current control and switch system 42 is such that the amplitude of the current flowing from the alternating current line or source 44 is a direct function of the amplitude of the error signal from the error sensing and signal device 37 and the polarity of the current flowing through the field coil 43 of the generator 29 is an inverse function of the polarity of the signal from the error sensing and signal device 37.

Through this system, operation of the controlled electro-differential drive is such that at a preselected speed setting for the potentiometer 27, one of the motors, for example the motor 13, will operate as a generator, generating a relatively high voltage, and the motor b, 15 will operate as a motor, with a resultant current flow from the motor a, 13 to the motor b, 15 through the armatures 16 and 18, respectively. The magnitude of this current and its direction will be sensed by the resistor or current sensing device 30 and an appropriate signal of the amplitude and direction of that current will be fed to the error sensing and signal device 37. It should be kept in mind during this discussion that for the constant torque output from the shaft 8 of the electro-differential drive system, the current flowing in the armature circuit should be maintained substantially constant and that is an important feature of the present invention.

The potential arriving at the error sensing and error signal device 37 from the current sensing device 30 will be comparable in polarity and amplitude with the reference potential from across the potentiometer 41. The setting of the potentiometer 41 controls the magnitude and polarity of this reference signal and since it is adjustable, an adjustable control for the torque output of the system is provided thereby.

Within the error sensing and error signal generating device 37, the current signal and reference signal are compared by such means as a null-adjusted bridge circuit or the like, and the different potential is then delivered to the current control and switch system as the error signal. This error signal exists only when the current in the armature circuit differs from a preselected value therefor, and when it falls below the preselected value the error signal will have one polarity; when the armature current rises above the preselected value therefor, the error signal will then have another polarity, an opposite polarity. The amplitude of the error signal is directly proportional to the magnitude of the variations between the armature current and the preselected value therefor. The current control and switch system 42 is so operated upon by the error signal that for an error of a given polarity, current will be permitted to flow through the generator field winding 43 in one direction at an amplitude such as to correct the current variation in the armature circuit and vice versa for an opposite error.

The armature 28 of the generator 29 which is rotated by a constant speed motor 45 in the presence of the fields of the field winding 43 thus has a varying output depending upon the current flow in the generator field winding 43 and the system is so arranged that when the current in the armature circuit is at its preselected value, there will be no current flow in the field winding 43 but if the current in the armature circuit should improperly increase, then current will be permitted to pass through the field winding 43 with such a direction and intensity that voltage will be generated in the armature 28 of generator 29 correcting the variation. The reverse occurs when the armature current falls below the preselected value; that is, when the armature current falls below its preselected value current is permitted to pass through the field winding 43 with such intensity and polarity to generate a reverse voltage in the armature 28 of the generator 29 thus correcting the error in an extremely stable, smooth and efficient operation by a system operable continuously through maximum field current in one direction to zero and therethrough to maximum field currents in the opposite direction.

Thus, it may be seen that the current through the field winding 43, and therefore the output or voltage generated in the armature 28 of the generator 29 has a polarity which is an inverse function of the polarity of the error signal and an amplitude or intensity which is a direct function of the amplitude or intensity of the error signal. The current control and switch system 42 for accomplishing this desired end in accordance with the principles of the present invention is schematically illustrated in Figure 3.

In Figure 3, the current control and bi-directional switch system 42 is shown connecting an A. C. power source, such as a 220 volt, 60 cycle power line 44 to the generator field coil 33 through a pair of inverted parallel back to back primary field current conducting and high conducting controllable switches such as electron tubes $V_1$ and $V_2$ respectively such that one side of the field coil 43 is connected directly to the A. C. power source line and the other side of the field coil 43 is connected to the plate 50 of the tube $V_1$ and to the cathode 51 of tube $V_2$, with the cathode 52 of the tube $V_1$ and the plate 53 of the tube $V_2$ connected together at the other side of the line 44. Another pair of substantially identical tubes $V_3$ and $V_4$ are connected across the field coil 43 with the cathode 54 of the tube $V_3$ connected to the plate 55 of the tube $V_4$ and to the first side of the field coil 43 and the first side of the power line 44.

The tubes $V_3$ and $V_4$ are so further connected across the field coil 43 that the plate 56 of tube $V_3$ and the cathode 57 of tube $V_4$ are connected together and to the second side of the field coil 43 and the plate 50 of the tube $V_1$ and the cathode 51 of the tube $V_2$.

These several tubes $V_1$, $V_2$, $V_3$ and $V_4$ are preferably high current conducting gas discharge controlled firing tubes such as thyratrons or the like, it being understood of course that the equivalent switch means may be substituted therefor within the true spirit of the scope of the present invention. It is also pointed out that in accordance with the principles of the present invention, it is not essential that tubes $V_3$ and $V_4$ be of identical character with the tubes $V_1$ and $V_2$ but for simplicity of explanation and illustration they are so portrayed. It is preferred that the tubes $V_1$ and $V_2$ be substantially similar types of switch means and that the tubes $V_3$ and $V_4$ be substantially similar types of switch means.

In addition to the above described circuitry for the current control and switch system 42, a phase shifter of controlled variable phase shift operation 60 is connected between the cathode 52 of the tube $V_1$ and the grid 61 thereof and a substantially identical unit or its equivalent of controlled phase shift operation 62 is connected between the cathode 51 of the discharge tube switch $V_2$ and the grid 63 thereof. Both the phase shifter 60 and the phase shifter 61 are controlled as hereinafter further described by signals conducted therethrough from a control amplifier 64 which has an input of the error signal from the error sensing and error signal generating device 37 (Figure 2). A bias supply 65 supplies a bias voltage to the grids 66 and 67 of the tubes $V_3$ and $V_4$ respectively and to the grids 61 and 63 of the tubes $V_1$ and $V_2$ respectively through the control amplifier 64 and the phase shifters 60 and 62.

The operation of the current control and switch system 42 is such that the bias potential provided to the several switch tubes from the bias supply 65 maintains all of the tubes well in their cutoff characteristics during normal operation. If, however, an error signal of, for example, positive polarity is provided to the control amplifier 64 from the error sensing and error signal generating system 37 due to improper armature currents in the electro-differential drive system 10 (Figure 2) then the signal will be amplified by control amplifier 64 and transmitted to the phase shifters 60 and 62. In this particular exemplary description of the operation of the current control in switch system 42, a positive error signal will operate the phase shifter 60 only to drive the tube $V_1$ further into its cutoff region of operation. The positive signal will operate on the phase shift 62, however, to reduce the bias thereon and control the firing point on the positive half cycle of the supply line and, in this manner, controllably conduct current through the field winding 43 and the tube $V_2$ from the supply line 44 in accordance with the intensity of the error signal.

It is an important feature of this system that current through the field winding 43 is not cut off at the end of the positive half cycle of the supply line energy but is further permitted to flow in the field winding 43 in the same direction upon a positive error signal but without damage to the tube $V_2$. At the end of the positive half cycle the tube $V_2$ is cut off but since the reserved energy in the field winding 43 is at a relatively high value it is permitted to discharge across the tube $V_4$ thus permitting continued current flow in the winding 43.

If, however, the error signal is of negative polarity then the phase shifter 62 will drive the switch tube $V_2$ further into cut off and the phase shifter 60 will so operate on the tube $V_1$ to permit conduction through the generator field coil 43 on the negative half cycle of the supply line energy with a current intensity of a direct function of the intensity of the error signal. Under these circumstances, the inductive stored energy in the coil 43 will be permitted to discharge across the tube $V_3$ during the positive half cycle of the supply line energy. This operation on a negative error signal is substantially identical to the mode of operation of the phase shifter 62 and the tubes $V_2$ and $V_4$ during a positive error signal operation.

As stated hereinabove, and further pointed out now for immediate attention, is the important feature that the operation of this current control and switch system 42 is extremely stable and continuous from maximum conduction in one direction through zero to a maximum conduction in the opposite direction. Further, the control afforded by this system in accordance with the principles of the present invention, this system being a preferred embodiment of the present invention, current conduction is provided with an intensity which is a direct function of the intensity of an error signal and with a polarity which in ultimate effect upon such systems as the electro-differential drive system (Figure 2) is an inverse function of the polarity of an error signal. In other systems, of course, the preferred embodiments of the present invention herein illustrated in Figure 3 and described in detail hereinabove may be so connected that the polarity of the current response is a direct function of the polarity of an error control system.

It will be understood that numerous variations and modifications may be made without departing from the true spirit and scope of the novel concepts of the present invention and the principles thereof.

I claim as my invention:

1. A bi-directional control system to maintain substantially constant current in a generator armature circuit by controlling current through field windings of the generator, comprising, armature current sensing means, means coupled to said sensing means to produce a signal corresponding in direction and amplitude to variations between armature circuit current and a preselected value therefor, a field winding, a source of field winding current, first and second oppositely disposed substantially unidirectional switches connected in parallel with each other and in series with said field winding and said source, and means interconnecting said first and second switches and said signal producing means to control conduction of individual switches in accordance with the direction of said signal and to control the amount of conduction of said switches in accordance with the amplitude of said signal, and third and fourth switch means connected across said field winding to conduct current flow in the same direction respectively as said first and second switches in dissipation of stored energy in said winding following current flow through said winding and one of said first mentioned switches, said means interconnecting said first and second switches further interconnecting said third and fourth switch means and including a biasing system operable to maintain said switches at cutoff during normal operation.

2. A bi-directional control system to maintain substantially constant current in a generator armature circuit by controlling current through field windings of the generator, comprising armature current sensing means, means coupled to said sensing means to produce a signal corresponding in direction and amplitude to variations between armature circuit current and a preselected value therefor, a field winding, a source of field winding current, first and second oppositely disposed substantially unidirectional switches connected in parallel with each other and in series with said field winding and said source, and means interconnecting said first and second switches and said signal producing means to control conduction of individual switches in accordance with the direction of said signal and to control the amount of conduction of said switches in accordance with the amplitude of said signal, and third and fourth switch means connected across said field winding to conduct current flow in the same direction respectively as said first and second switches in dissipation of stored energy in said winding following current flow through said winding and one of said first mentioned switches, said means interconnecting said first and second switches including switch control means to operate one of said switches during positive error signals and the other of said switches during negative error signals.

3. In a bi-directional control system, a generator having a field winding, means to produce a signal of variable amplitude and polarity, and means for controlling the field excitation of the generator in accordance with the signal, comprising: a source of field winding current, first and second oppositely disposed substantially unidirectional switches connected in parallel with each other and in series with said field winding and said source, means interconnecting said first and second switches and said signal producing means to control conduction of individual switches in accordance with the direction of said signal and to control the amount of conduction of said switches in accordance with the amplitude of said signal, and third and fourth switch means connected across said field winding to conduct current flow in the same direction respectively as said first and second switches in dissipation of stored energy in said winding following current flow through said winding in one of said first mentioned switches.

References Cited in the file of this patent

UNITED STATES PATENTS

| 2,393,620 | Adams et al. | Jan. 29, 1946 |
| 2,504,878 | Reilly | Apr. 18, 1950 |
| 2,550,122 | Osbon | Apr. 24, 1951 |
| 2,659,040 | Halter | Nov. 10, 1953 |
| 2,692,361 | Asbury et al. | Oct. 19, 1954 |

FOREIGN PATENTS

| 758,330 | Germany | Aug. 3, 1953 |